(12) United States Patent
Arnold et al.

(10) Patent No.: US 12,465,522 B2
(45) Date of Patent: Nov. 11, 2025

(54) METHODS AND PROBES FOR INTRASCLERAL LASER SURGERY

(71) Applicant: IRIDEX Corporation, Mountain View, CA (US)

(72) Inventors: Ken Arnold, Corralitos, CA (US); George Marcellino, Santa Cruz, CA (US)

(73) Assignee: IRIDEX Corporation, Mountain View, CA (US)

( * ) Notice: Subject to any disclaimer, the term of this patent is extended or adjusted under 35 U.S.C. 154(b) by 763 days.

(21) Appl. No.: 17/544,157

(22) Filed: Dec. 7, 2021

(65) Prior Publication Data
US 2022/0175580 A1 Jun. 9, 2022

Related U.S. Application Data

(60) Provisional application No. 63/122,241, filed on Dec. 7, 2020.

(51) Int. Cl.
*A61F 9/008* (2006.01)
*A61F 9/007* (2006.01)

(52) U.S. Cl.
CPC ...... *A61F 9/00821* (2013.01); *A61F 9/00736* (2013.01); *A61F 9/00781* (2013.01);
(Continued)

(58) Field of Classification Search
CPC ............ A61F 9/00736; A61F 9/00781; A61F 9/00821; A61F 9/00823; A61F 2009/00865; A61F 2009/891
(Continued)

(56) References Cited

U.S. PATENT DOCUMENTS 2,033,397 A 3/1936 Frances
5,121,740 A 6/1992 Uram
(Continued)

FOREIGN PATENT DOCUMENTS

CN 201085686 7/2008
CN 101309725 11/2008
(Continued)

OTHER PUBLICATIONS

Allingham et al., "Probe Placement and Power Levels in Contact Transscleral Neodymium:YAG Cyclophotocoagulation", Arch Ophthalmol, vol. 108, May 1990, pp. 738-742.
(Continued)

*Primary Examiner* — Ahmed M Farah
(74) *Attorney, Agent, or Firm* — Kilpatrick Townsend & Stockton LLP

(57) ABSTRACT

Methods of treating an eye are provided that entail partially penetrating the sclera and delivering light energy from an optical fiber within the penetration to treat the a target tissue in the eye, for example, to coagulate vasculature underlying the sclera within a planned incision area. Also provided are treatment probes for treating an eye of a patient includes an elongate body that defines a handle and an advanceable penetrating member and optical fiber housed within the elongate body. The probe is configured to advance the penetrating member so as to penetrate the sclera, only partially, and advance the treatment fiber into the penetration to deliver treatment light energy to coagulate the vasculature underlying the sclera. The probe can include one or more penetrating members and corresponding optical fibers to form one or more penetrations concurrently within the planned incision area.

29 Claims, 11 Drawing Sheets

(52) U.S. Cl.
CPC ............... *A61F 2009/00865* (2013.01); *A61F 2009/00878* (2013.01); *A61F 2009/00891* (2013.01)

(58) Field of Classification Search
USPC .......................................................... 606/6
See application file for complete search history.

(56) References Cited

U.S. PATENT DOCUMENTS

| | | | |
|---|---|---|---|
| 5,129,895 A * | 7/1992 | Vassiliadis | A61F 9/008 606/17 |
| 5,151,098 A | 9/1992 | Loertscher | |
| 5,174,304 A | 12/1992 | Latina et al. | |
| 5,217,452 A | 6/1993 | O'Donnell | |
| 5,370,641 A * | 12/1994 | O'Donnell, Jr. | A61F 9/008 606/4 |
| 5,372,595 A * | 12/1994 | Gaasterland | A61F 9/008 606/4 |
| 5,460,182 A | 10/1995 | Goodman et al. | |
| 5,478,338 A | 12/1995 | Reynard | |
| 5,511,085 A | 4/1996 | Marshall | |
| 5,514,125 A | 5/1996 | Lasser et al. | |
| 5,521,932 A | 5/1996 | Marshall | |
| 5,533,998 A | 7/1996 | Freese et al. | |
| 5,549,596 A | 8/1996 | Latina | |
| 5,549,632 A | 8/1996 | Lai | |
| 5,582,608 A | 12/1996 | Brown | |
| 5,663,979 A | 9/1997 | Marshall | |
| 5,752,967 A | 5/1998 | Kritzinger et al. | |
| 5,807,380 A | 9/1998 | Dishler | |
| 5,928,220 A | 7/1999 | Shimoji | |
| 5,968,033 A | 10/1999 | Fuller et al. | |
| 5,982,789 A | 11/1999 | Marshall et al. | |
| 6,013,096 A | 1/2000 | Tucek | |
| 6,059,772 A | 5/2000 | Hsia et al. | |
| 6,144,484 A | 11/2000 | Marshall | |
| 6,221,028 B1 | 4/2001 | Lieberman et al. | |
| 6,222,869 B1 | 4/2001 | Marshall et al. | |
| 6,319,274 B1 | 11/2001 | Shadduck | |
| 6,327,291 B1 | 12/2001 | Marshall | |
| 6,377,599 B1 | 4/2002 | Marshall | |
| 6,454,763 B1 | 9/2002 | Motter et al. | |
| 6,458,120 B1 | 10/2002 | Shen et al. | |
| 6,540,391 B2 | 4/2003 | Lanzetta et al. | |
| 6,607,524 B1 | 8/2003 | LaBudde et al. | |
| 6,733,490 B1 | 5/2004 | Falsini et al. | |
| 6,800,076 B2 | 10/2004 | Humayun | |
| 7,357,570 B2 | 4/2008 | Schuele | |
| 7,452,080 B2 | 11/2008 | Wiltberger et al. | |
| 7,452,081 B2 | 11/2008 | Wiltberger et al. | |
| 7,537,593 B2 | 5/2009 | Humayun | |
| 7,599,591 B2 | 10/2009 | Andersen et al. | |
| 7,766,904 B2 | 8/2010 | Mc et al. | |
| 7,771,417 B2 | 8/2010 | Telfair et al. | |
| 7,909,040 B2 | 3/2011 | Jones et al. | |
| 7,909,816 B2 | 3/2011 | Buzawa | |
| 7,988,688 B2 | 8/2011 | Webb et al. | |
| 8,040,582 B2 | 10/2011 | Angeley et al. | |
| 8,177,777 B2 | 5/2012 | Humayun | |
| 8,336,555 B2 | 12/2012 | Palanker et al. | |
| 8,568,393 B2 | 10/2013 | Palanker | |
| 8,588,268 B2 | 11/2013 | Boutoussov et al. | |
| 8,591,501 B2 | 11/2013 | Mintz et al. | |
| 8,734,433 B2 | 5/2014 | Palanker et al. | |
| 8,747,395 B2 | 6/2014 | Rathjen | |
| 8,771,261 B2 | 7/2014 | Andersen et al. | |
| 8,945,103 B2 | 2/2015 | Chew et al. | |
| 9,004,780 B2 | 4/2015 | Yee et al. | |
| 9,101,447 B2 | 8/2015 | Sramek | |
| 9,122,131 B2 | 9/2015 | Coppage et al. | |
| 9,241,831 B2 | 1/2016 | Peartree et al. | |
| 9,254,079 B2 | 2/2016 | Hutchison | |
| 9,265,656 B2 | 2/2016 | Yee | |
| 9,278,029 B2 | 3/2016 | Yee et al. | |
| 9,307,985 B2 | 4/2016 | Vold et al. | |
| 9,498,295 B2 | 11/2016 | Palanker | |
| 9,629,749 B2 | 4/2017 | Vold et al. | |
| 9,642,747 B2 | 5/2017 | Sramek | |
| 9,681,985 B2 | 6/2017 | Andersen et al. | |
| 9,700,461 B2 | 7/2017 | Buzawa et al. | |
| 9,707,129 B2 | 7/2017 | Yee | |
| 9,820,883 B2 | 11/2017 | Berlin | |
| 9,835,795 B2 | 12/2017 | Thomsen et al. | |
| 9,857,666 B2 | 1/2018 | Coppage et al. | |
| 9,901,343 B2 | 2/2018 | Vold et al. | |
| 10,064,756 B2 | 9/2018 | Hutchison | |
| 10,098,781 B2 | 10/2018 | Mordaunt et al. | |
| 10,179,071 B2 | 1/2019 | Mordaunt et al. | |
| 10,238,540 B2 | 3/2019 | Yee et al. | |
| 10,238,541 B2 | 3/2019 | Yee et al. | |
| 10,292,868 B2 | 5/2019 | Chew et al. | |
| 10,369,049 B1 * | 8/2019 | Chen | A61F 9/009 |
| 10,398,599 B2 | 9/2019 | Charles | |
| 10,488,606 B2 | 11/2019 | Wiltberger et al. | |
| 10,500,094 B2 | 12/2019 | Buzawa et al. | |
| 10,500,095 B2 | 12/2019 | Yee | |
| 10,524,656 B2 | 1/2020 | Wiltberger et al. | |
| 10,617,564 B1 | 4/2020 | Andersen et al. | |
| 10,744,036 B2 | 8/2020 | Mordaunt et al. | |
| 10,758,118 B2 | 9/2020 | Chen et al. | |
| 10,758,415 B2 | 9/2020 | Sramek | |
| 10,758,418 B2 | 9/2020 | Vold et al. | |
| 10,912,677 B2 | 2/2021 | Mordaunt et al. | |
| 10,912,678 B2 | 2/2021 | Andersen et al. | |
| 11,020,612 B2 | 6/2021 | Chen | |
| 11,026,860 B2 | 6/2021 | Andersen et al. | |
| 11,058,890 B2 | 7/2021 | Chen | |
| 11,116,663 B2 | 9/2021 | Sramek | |
| 11,116,666 B2 | 9/2021 | Chew et al. | |
| 11,143,828 B2 | 10/2021 | Wiltberger et al. | |
| 11,224,538 B2 * | 1/2022 | Heriot | A61F 9/008 |
| 11,351,059 B2 * | 6/2022 | Chen | A61F 9/00781 |
| 11,931,294 B2 * | 3/2024 | Chen | A61F 9/00781 |
| 2002/0126501 A1 | 9/2002 | Toth et al. | |
| 2003/0109907 A1 | 6/2003 | Shadduck | |
| 2004/0098070 A1 | 5/2004 | Mohr et al. | |
| 2005/0055015 A1 | 3/2005 | Buzawa | |
| 2006/0021623 A1 | 2/2006 | Miller et al. | |
| 2006/0084952 A1 * | 4/2006 | Pallikaris | A61F 9/008 606/6 |
| 2006/0095096 A1 | 5/2006 | Debenedictis et al. | |
| 2006/0187978 A1 | 8/2006 | Telfair et al. | |
| 2008/0097415 A1 | 4/2008 | Zimare et al. | |
| 2008/0107384 A1 | 5/2008 | Nadolski et al. | |
| 2008/0108981 A1 | 5/2008 | Telfair et al. | |
| 2008/0154251 A1 | 6/2008 | Stuart et al. | |
| 2008/0281303 A1 * | 11/2008 | Culbertson | A61F 2/1662 606/5 |
| 2008/0287935 A1 | 11/2008 | Bille | |
| 2009/0182312 A1 | 7/2009 | Gertner et al. | |
| 2009/0298391 A1 | 12/2009 | Yamada | |
| 2010/0076419 A1 | 3/2010 | Chew et al. | |
| 2010/0130968 A1 | 5/2010 | Vogler | |
| 2011/0001926 A1 | 1/2011 | Mann et al. | |
| 2011/0069278 A1 | 3/2011 | Gueder | |
| 2011/0112376 A1 | 5/2011 | Vayser et al. | |
| 2013/0079759 A1 | 3/2013 | Dotson et al. | |
| 2014/0088577 A1 | 3/2014 | Anastassiou et al. | |
| 2014/0121653 A1 | 5/2014 | Abe et al. | |
| 2014/0142663 A1 | 5/2014 | Van Valen | |
| 2014/0267668 A1 | 9/2014 | Ignatovich et al. | |
| 2015/0014047 A1 | 1/2015 | Hutchison et al. | |
| 2015/0073399 A1 | 3/2015 | Boitor et al. | |
| 2015/0085254 A1 | 3/2015 | Sramek et al. | |
| 2015/0157198 A1 | 6/2015 | Sramek et al. | |
| 2015/0157505 A1 | 6/2015 | Neev | |
| 2015/0209179 A1 | 7/2015 | Chew et al. | |
| 2015/0305938 A1 | 10/2015 | Vold et al. | |
| 2015/0374539 A1 | 12/2015 | Buzawa et al. | |
| 2016/0015565 A1 | 1/2016 | Scheller et al. | |
| 2016/0074672 A1 | 3/2016 | Schomacker et al. | |
| 2017/0000648 A1 | 1/2017 | Chabrier et al. | |
| 2017/0181890 A1 | 6/2017 | Vold et al. | |

(56) References Cited

U.S. PATENT DOCUMENTS

| | | | |
|---|---|---|---|
| 2018/0000337 A1 | 1/2018 | Chen et al. | |
| 2018/0000638 A1 | 1/2018 | Buzawa et al. | |
| 2018/0360310 A1* | 12/2018 | Berlin | A61B 3/13 |
| 2020/0069463 A1 | 3/2020 | Chen et al. | |
| 2020/0206521 A1 | 7/2020 | Chen | |
| 2020/0306080 A1 | 10/2020 | Herekar et al. | |

FOREIGN PATENT DOCUMENTS

| | | |
|---|---|---|
| CN | 104936506 | 9/2015 |
| DE | 19916653 | 10/2000 |
| EP | 0960601 | 10/2006 |
| EP | 2068694 | 6/2009 |
| EP | 2241280 | 10/2010 |
| JP | 06505906 | 7/1994 |
| JP | 07250862 | 10/1995 |
| JP | 2002136599 | 5/2002 |
| JP | 2002282298 | 10/2002 |
| JP | 2008523912 | 7/2008 |
| JP | 2008544809 | 12/2008 |
| JP | 2010533034 | 10/2010 |
| JP | 2012521808 | 9/2012 |
| JP | 2013099549 | 5/2013 |
| JP | 2013519492 | 5/2013 |
| JP | 2017506562 | 3/2017 |
| KR | 20150129139 | 11/2015 |
| SU | 508984 | 8/1979 |
| WO | 9216259 | 10/1992 |
| WO | 2000057229 | 9/2000 |
| WO | 2001026591 | 4/2001 |
| WO | 2007054490 | 5/2007 |
| WO | 2008034609 | 3/2008 |
| WO | 2013059564 | 4/2013 |
| WO | 2015130821 | 9/2015 |
| WO | 2015200875 | 12/2015 |
| WO | 2018005796 | 1/2018 |

OTHER PUBLICATIONS

Beckman et al., "Transscleral Ruby Laser Irradiation of the Ciliary Body in the Treatment of Intractable Glaucoma", Tr. Am. Acad. Ophth. & Otol., vol. 76, Mar.-Apr. 1972, pp. 423-436.

Gaasterland et al., "Initial Experience with a New Method of Laser Transscleral Cyclophotocoagulation for Ciliary Ablation in Severy Galucoma", Trans Am Ophthalmol Soc., vol. 90, 1992, pp. 225-246.

Goel et al., "Aqueous Humor Dynamics: A Review", The Open Ophthalmology Journal, vol. 4, Sep. 3, 2010, pp. 52-59.

Iridex, "G-Probe™ Operator Manual", 131 05-EN Rev D, May 2013, 17 pages.

Kosoko et al., "Long-Term Outcome of Initial Ciliary Ablation with Contact Diode Laser Transscleral Cyclophotocoagulation for Severe Glaucoma", Ophthalmology, vol. 103, No. 8, Aug. 1996, pp. 1294-1302.

Schuman et al., "Laser Cyclophotocoagulation", International Ophthalmology Clinics, vol. 30, No. 2, Spring 1990, pp. 111-119.

Shields, "Surgical Anatomy", Glaucoma Surgery, Harvard Medical School, Massachusetts Eye and Ear Infirmary, Boston, Massachusetts, Mosby Year Book, 1992, 5 pages.

Tan et al., "Mircopulse Transscleral Diode Laser Cyclophotocoagulation in the Treatment of Refractory Glaucoma", Clinical and Experimental Ophthalmology, vol. 38, No. 3, Apr. 2010, pp. 266-272.

* cited by examiner

METHODS AND PROBES FOR INTRASCLERAL LASER SURGERY

CROSS REFERENCE TO RELATED APPLICATIONS

The present application claims the benefit of U.S. Provisional Appln. No. 63/122,241 filed Dec. 7, 2020; the full disclosure which is incorporated herein by reference in its entirety for all purposes.

FIELD OF THE INVENTION

The present invention is directed generally to medical devices, systems, and methods relating to treatments of an eye. Embodiments of the invention are directed toward methods of treating tissues in the eye and probes for the delivery of light energy within an eye for such treatments.

BACKGROUND

Glaucoma is a leading cause of blindness. Glaucoma involves the loss of retinal ganglion cells in a characteristic pattern of optic neuropathy. Untreated glaucoma can lead to permanent damage of the optic nerve and resultant visual field loss, which can progress to blindness. The loss of visual field due to glaucoma often occurs gradually over a long time and may only be recognized when the loss is already quite advanced. Once lost, this damaged visual field can never be recovered.

Raised intraocular pressure (IOP) is a significant risk factor for developing glaucoma. IOP is a function of production of aqueous humor by the ciliary body of the eye and its drainage through the trabecular meshwork and all other outflow pathways including the uveoscleral pathway. Aqueous humor is a complex mixture of electrolytes, organics solutes, and other proteins that supply nutrients to the non-vascularized tissues of the anterior chamber of the eye. It flows from the ciliary bodies into the posterior chamber of the anterior segment, bounded posteriorly by the lens and the ciliary zonule and bounded anteriorly by the iris. Aqueous humor then flows through the pupil of the iris into the anterior chamber, bounded posteriorly by the iris and anteriorly by the cornea. In the conventional aqueous humor outflow path, the trabecular meshwork drains aqueous humor from the anterior chamber through the trabecular meshwork exiting into the Schlemm's canal into scleral plexuses and the general venous blood circulation. In open angle glaucoma there is reduced flow through the trabecular meshwork. In angle closure glaucoma, the iris is pushed forward against the trabeular meshwork, blocking fluid from escaping.

Currently, glaucoma therapies aim to reduce TOP by either limiting the production of aqueous humor or by increasing the outflow of aqueous humor. Medications such as beta-blockers, carbonic anhydrase inhibitors, etc., are used as the primary treatment to reduce the production of aqueous humor. Medications may also be used as the primary therapy to increase the outflow of the aqueous humor. Miotic and cholinergic drugs increase the trabecular outflow, while prostaglandin drugs, for example, Latanoprost and Bimatoprost, increase the uveoscleral outflow. These drugs can be periodically injected directly into the eye or can be eluted slowly from an implant placed into the eye through an incision in the sclera. An implant having a drug-eluting reservoir is preferable as it slowly releases the drug over time, which can provide effective treatment for overs six months, thereby reducing the costs and trauma associated with frequent injections. One challenge associated with such implants, however, is that the scleral incision required to place the implant within the eye cuts through a high-flow vasculature of the choroid underlying the sclera. This often causes excessive bleeding during or after the procedure, which can cause complications and damage to tissues of the eye. Current approaches to reducing or preventing bleeding have failed to adequately resolves this problem and often present additional complications and risks, as discussed further below.

Therefore, there is a need for improved methods and devices that can address the problem of excessive bleeding of the vasculature underlying the sclera when forming an incision for placement of an implant. Moreover, the sclera presents challenges in delivering treatment to target tissues due to the thickness and optical properties of the sclera, thus, there is a need for improved methods and devices that allow for improved delivery of treatment through the sclera to target tissues.

BRIEF SUMMARY

In one aspect, the embodiments described herein provide improved methods and probes for prophylactically treating tissue within a planned incision region. In particular, the methods and devices pertain to intrascleral delivery of light energy to coagulate the vasculature of the choroid underlying the sclera within a planned incision area.

In some embodiments, the invention pertains to methods of prophylactically treating an eye of a patient that includes: identifying an incision area in which an incision is to be formed in a sclera of the eye; penetrating the sclera, only partially, with a penetrating member within the incision area at a first location; delivering an optic fiber into the partly penetrated sclera at the first location; and delivering treatment light energy through the fiber at the first location so as to coagulate vasculature underlying the sclera within the incision. Penetrating the sclera can entail advancing a needle or cannula into the sclera. Typically, the planned incision area is over the sclera adjacent the limbus. In some embodiments, the light energy is within the visible light spectrum, for example, laser energy with a green or yellow light range of the visible light spectrum, to facilitate coagulation of blood vessels. In some embodiments and other types o, the energy delivered is not within the visible light spectrum (e.g. infrared).

The methods can further include positioning a probe, the probe having the penetrating member and optical fiber operably disposed within, at a desired location along the identified incision area. In some embodiments, the probe includes an alignment edge on the contact surface for placement against, a reference feature of the eye, such as the limbus. Such methods further include advancing the penetrating member from the probe, thereby partially penetrating the sclera; and advancing the treatment fiber from the probe into the partially penetrated sclera. In some embodiments, the probe includes a stop corresponding to a desired depth of the scleral penetration. The desired depth can be any suitable depth for a given treatment. The desired depth can be determined based on a relationship between one or more treatment parameters of energy delivery and scleral thickness. In some embodiments, the desired depth is at least 10%, at least 25% or at least 50% of estimated or measured scleral thickness. The methods can further include adjusting a depth control of the probe that sets the stop to the desired depth. In some embodiments, the depth control can be adjusted based on an estimate or assessment of scleral thickness. In some embodiments, the methods can include repeating the above noted procedure at one or more additional locations sequentially so as to coagulate the vasculature underlying the sclera within the incision area. In other embodiments, the probe includes multiple penetrating member such that the series of penetrations can be formed simultaneously.

In another aspect, the invention pertains to a probe for prophylactically treating a planned incision area in an eye. The probe can include: an elongate body defining a handle having a proximal end and a distal end; a penetrating member housed in the elongate body and configured for partially penetrating a sclera of the eye; an optical fiber housed in the elongate body and configured for delivering light energy to the eye from a distal end of the treatment fiber while the fiber is disposed within the sclera so as to coagulate a vasculature underlying the sclera; and a contact member disposed on an end of the elongate body, the contact member including a contact surface for positioning on a surface of the eye. In some embodiments, the penetrating member and the treatment fiber are advanceable distal of the contact surface when positioned on the surface of the eye. Typically, the penetrating member is a needle or cannula and the treatment fiber is advanceable through the needle or cannula.

In another aspect, the probe includes one or more manual control features on the elongate body to effect advancement of the penetrating member and the optical fiber. The probe can include a depth control that limits advancement of the penetrating member to a set depth of penetration to ensure the sclera is only partially penetrated. In some embodiments, the depth control includes a stop that limits advancement of the penetrating member to a set depth of penetration to ensure the sclera is only partially penetrated. The desired scleral thickness can be any desired depth suitable for a given procedure. In some embodiments, the depth control is set to penetrate at least 25% of scleral thickness, in other embodiments, at least 50% of the scleral thickness or greater. For typical scleral thickness, the depth is typically between 300 microns and 800 microns. In some embodiments, the depth control is adjustable by a user based on a desired depth for a given patient. The depth control can be a manually adjustable feature on the elongate housing.

In another aspect, the probe includes an optical fiber is optically coupled to a light energy source configured to emit laser light energy within the visible light spectrum. The optical fiber is optically coupled to a light energy source configured to emit laser light energy within the yellow or green range of the visible light spectrum. In some embodiments, the light laser energy source is included within a laser light control console that is configured to control parameters based on the set depth of the depth control and an estimated thickness of the sclera.

In yet another aspect, the probe can include multiple penetrating members such that multiple penetrations can be formed along the planned incision area simultaneously. The multiple penetrating members are spaced apart so that the coagulated vasculature covers the entire planned incision area. Typically, the multiple penetrating members comprises between 2 and 10 penetrating members. The plurality of penetrating members are disposed at regular intervals along a line or along an arc. In a particular embodiment, the multiple penetrating members comprises 4 penetrating members so as to cover a planned incision area between 2 and 5 mm, typically about 3.5 mm in length. In some embodiments, the probe is configured such that the multiple penetrating members are supported by a common actuation member, movement of which is limited by a common depth control such that the plurality of penetrating members concurrently penetrate the sclera, only partially, when the common actuation member is actuated. In some embodiments, the system is configured to power the probe so each fiber of the multiple penetrating members applies light energy at suitable power (e.g. between about 1 to about 1.5 W), the probe being applied for suitable duration (e.g. 5 sec or less, 2-3 sec) at one or more areas to effect treatment. The light energy can be pulsed or continuous wave emission modes.

In another aspect, the invention pertains to methods and probes for delivering treatment of target tissues within the eye through the sclera. In particular, the methods and devices pertain to intrascleral delivery of energy through the sclera to modify and/or reshape target tissues within the eye. It is appreciated that any of the aspects described herein can be applied to a probe or method for delivering energy through a partly penetrated sclera for treatment of tissues within the eye.

BRIEF DESCRIPTION OF THE DRAWINGS

The present embodiments are described in conjunction with the appended figures.

Figure 1:
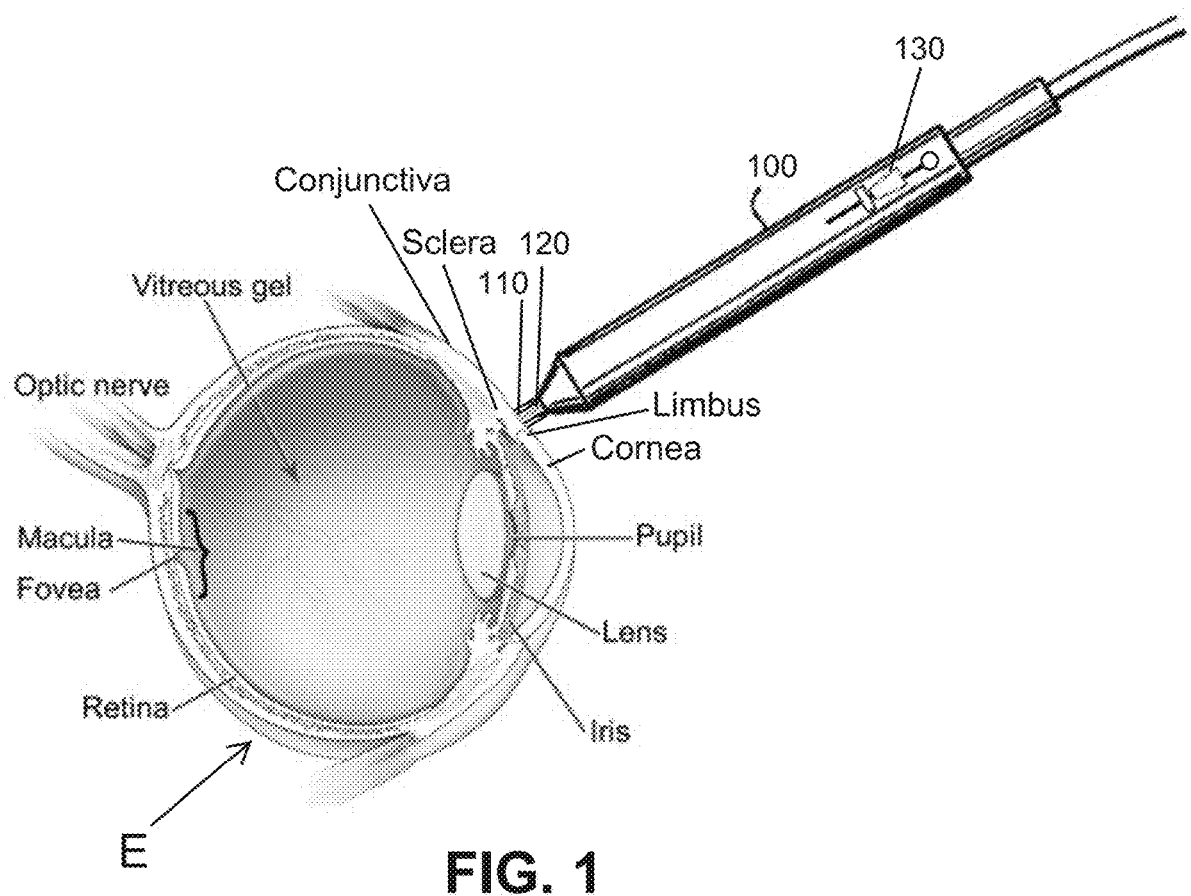
FIG. 1 illustrates the anatomy of an eye with relevant parts labeled to provide anatomical references and an exemplary probe for intrascleral laser therapy.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The present invention pertains to methods of treatments of an eye and probes configured to perform such methods. In one aspect, the embodiments described herein provide methods and probes configured for prophylactically treating the eye to prevent bleeding from subsequently formed incisions, particularly incisions for drug-eluting implants for treatment of glaucoma. In another aspect, the embodiments described herein provide methods and probes configured for intrascleral delivery of treatment of any number of target tissues. The ensuing description provides exemplary embodiments only, and is not intended to limit the scope, applicability or configuration of the disclosure. Rather, the ensuing description of the embodiments will provide those skilled in the art with an enabling description for implementing one or more exemplary embodiments, it being understood that various changes may be made in the function and arrangement of elements without departing from the spirit and scope of the invention as set forth in the appended claims.

In one aspect, embodiments of the present invention are directed towards methods of intrascleral deliver of light energy. In particular, the methods include delivering light laser energy through a probe, with the probe tip (i.e. emission/output portion) positioned within the sclera tissue and firing the beam through only a portion of the sclera for therapeutic treatment of structures behind the sclera. Typically, the methods target the vasculature of the choroid underlying the sclera along where an incision is made for implantation of an implant, typically a drug-eluting implant for slow release of drugs that reduce IOP for treatment of glaucoma. In some embodiments, the targeted region is the underlying vasculature within a planned incision area, which typically is about a 4 mm by 1 mm region that corresponds to a 3.5 mm incision that will be made through the sclera and choroid vasculature to allow an implant to be inserted with little to no intraoperative or post operative bleeding at the implant site. The objective of this prophylactic treatment is to stop bleeding without damaging surrounding structures. Typically, the incisions for such implants is about 4 mm posterior of the limbus.

Conventional probes that provide treatments of tissues within the eye by transmission of laser light typically transmit light across the intact sclera, which is a full transcleral approach. This is particularly challenging since the sclera has poor light transmissivity and strong scattering properties, particularly to visible light. These properties are what gives the sclera, also known as the "white of the eye," an opaque appearance because the sclera blocks and scatters visible light. For these reasons, conventional probe devices typically use infrared wavelengths that allow for better transmission across the sclera; however, this approach can cause undesirable damage to certain tissues and is not well suited for coagulation of vasculature underlying the sclera. Another challenge is that the light energy that is well suited for coagulation of vasculature is within the visible light range, which is precisely the light energy wavelengths that do not transmit well across the sclera. In order to reach suitable coagulation energies, the power and spot size of the energy required would cause damage to surrounding tissues.

These challenges can be largely overcome by inserting an optical fiber of a probe some depth into the sclera tissue, then deliver the light energy from that point through the remaining scleral tissue and to the desired target tissue (i.e. choroid vasculature). This however is no easy task as the sclera is among the most rigid and difficult to cut tissues within the human body. Therefore, to allow the optical fiber to be placed within the sclera, the methods first partially penetrate the sclera, then advance the optical fiber into the sclera. By providing controlled penetration of the sclera at a controlled depth to ensure the sclera is only partially penetrated, the present methods and probes allow for improved energy delivery through the remaining portion of the sclera, which allows for coagulation of the underlying vasculature to prevent bleeding without causing damage to surrounding tissues. This approach substantially avoids the poor light transmissivity characteristics of the sclera and further allows transmission of light energy (e.g. visible light energy) that is better absorbed by the underlying vasculature in order to effect coagulation along the planned incision area, while limiting damage to surrounding tissues and vasculature.

In one aspect, the methods entails determine the desired depth of insertion, which can be a determinative parameter, since it roughly determines the remaining thickness of sclera until the choroid is reached. This thickness dictates the amount of light that will transmit through and enlarge to the spot size at the vasculature. Therefore, the depth becomes a treatment parameter where by controlling the depth of insertion and the spot size (e.g. fiber core size) the transmission % and area of the light on the choroid vasculature can be determined. These parameters can be selected to achieve a desired coagulation zone in the choroid vasculature (e.g. 4 mm by 1 mm).

In another aspect, power and time can also be determinative factors in the resulting area being treatment. Both power and time can be determined in combination with the desired depth of the probe in the sclera, as well as an estimated or measure thickness of the sclera, in order to optimize the intrascleral treatment. Most specifically the sclera depth determines the 'effective spot size' on the choroid vasculature. Then based on the transmission at that depth, the power and time can be optimized to achieve the therapeutic effect (e.g. coagulation). In some embodiments, the light energy used is within the visible light range, which is better absorbed by the blood vessels of the vasculature to ensure coagulation. In some embodiments, the methods and probe utilize laser light energy within the green or yellow wavelengths, (i.e., 532 or 577 nm) for the choroid vasculature. Wavelengths across the spectrum from visible to IR can be used for a given treatment. Ideally, the chosen wavelength would be selected to interact with the target tissue as desired and to minimize interaction with the scleral tissue which it propagates through. Many of the potential targets contain blood and/or pigment which become the primary absorber. Often visible spectrum light is well absorbed in blood, especially in the green to yellow range (e.g., 500 nm-600 nm, 520 nm, 532 nm, 577 nm) and can be used to target vascular tissues. Near IR light is also reasonably well absorbed by blood and is well absorbed by melanin. For example, light in the range of 700 nm-1100 nm (e.g., 810 nm) is suitable to treat targets with melanin or reasonable blood content. It is appreciated however, that the above approach is not limited to any particular wavelength and can utilize any light energy or laser energy of any particular wavelength or range of wavelengths as suited for a particular application or treatment modality.

In another aspect, the invention pertains to a probe that includes both a penetrating member and an optical fiber, each of which is advanceable (either together or separately) distally of a distal contact surface of the probe. Advantageously, the probe includes a depth control to provide a desired depth of penetration and prevent the penetrating member from fully penetrating the sclera. As the thickness of the sclera can vary widely between patients, the depth control can be adjustable by the clinician based on the estimated or measured thickness of the sclera of a given patient. The depth control can include a stop that prevents movement of the penetrating member beyond a certain depth. The probe can also include control features to facilitate advancement and retraction of the penetrating member and the optical fiber. Typically, the depth control is set to a desired depth, the penetrating member is then advanced to partially penetrate the sclera, and then the optical fiber is advanced through the penetrating member to allow intrascleral delivery of light energy to the underlying vasculature. This process can be repeated at multiple locations to treat an entire planned incision area or targeted area. In some embodiments, the probe can include multiple penetrating members and optical fibers such that a series of penetrations can be made along the entire planned incision region concurrently so as to allow delivery of energy at each penetration to deliver light energy to coagulate the vasculature underlying the entire planned incision area or to deliver energy to treat target tissues.

Having described various embodiments generally, additional aspects and features of the invention will be more readily apparent with reference to the description of the various figures provided herein below.

FIG. 1 illustrates an exemplary intrascleral laser therapy probe 100 positioned on an eye E to effect a prophylactic treatment before an incision. The probe includes an advanceable penetrating member 110 and optical fiber 120 and one or more controls 130 on a proximal handle to effect actuation of the penetrating member at a controlled depth and advancement of the optical fiber. The delivery of light energy can be also be effect by a control on the probe, or alternatively, by controls on a light energy console operably coupled with the probe.

FIG. 1 further depicts the anatomy of an eye E with relevant parts labeled to provide anatomical references. The sclera is a tough sheath around the eye which meets the cornea at a circular junction called the limbus. Behind the cornea lies the iris, the lens and the ciliary body and related processes. The anterior chamber is the fluid-filled compartment within the eye 1 just in front of the pupil. Viewed in profile, the anterior chamber is bounded by the domed cornea in front and by the colored iris behind. Where the cornea and the iris converge they form an angle referred to herein as the angle of the anterior chamber. As can be seen, the probe 100 is positioned perpendicular to the curvature on the eye on the sclera adjacent the limbus. A thin layer of cells known as the conjunctiva overlays the sclera.

Figure 2A:
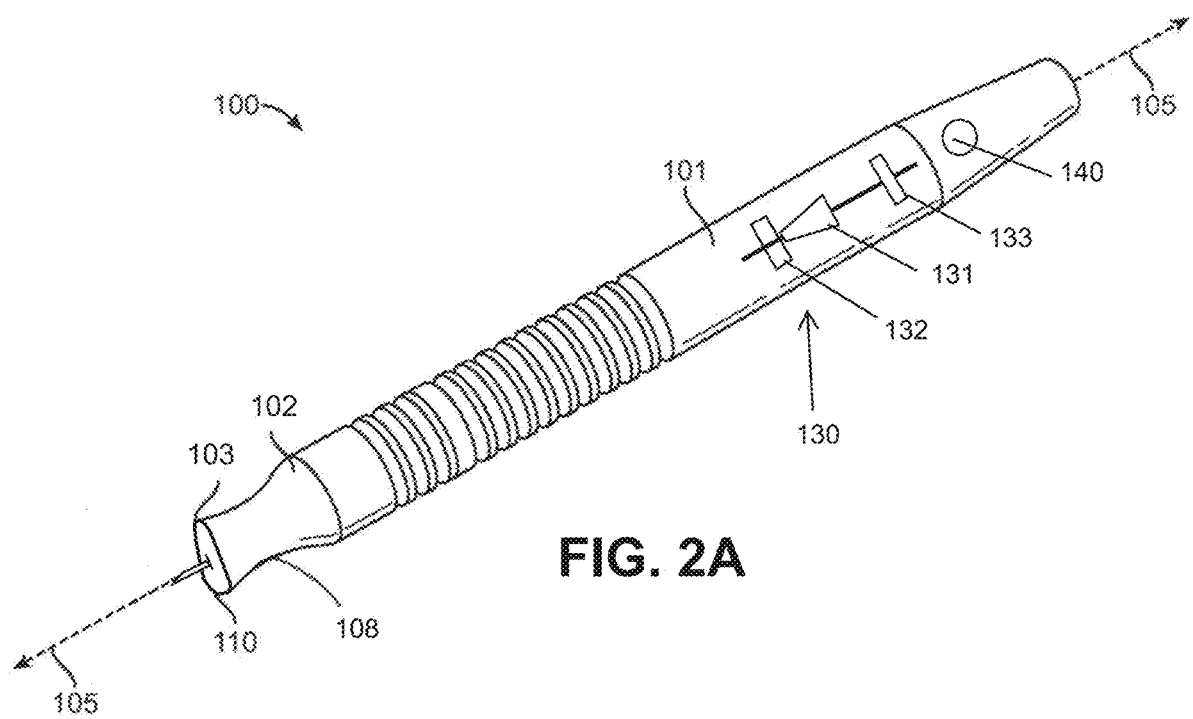
FIG. 2A illustrates an exemplary embodiment of an intrascleral probe, in accordance with some embodiments.
Figure 2B:
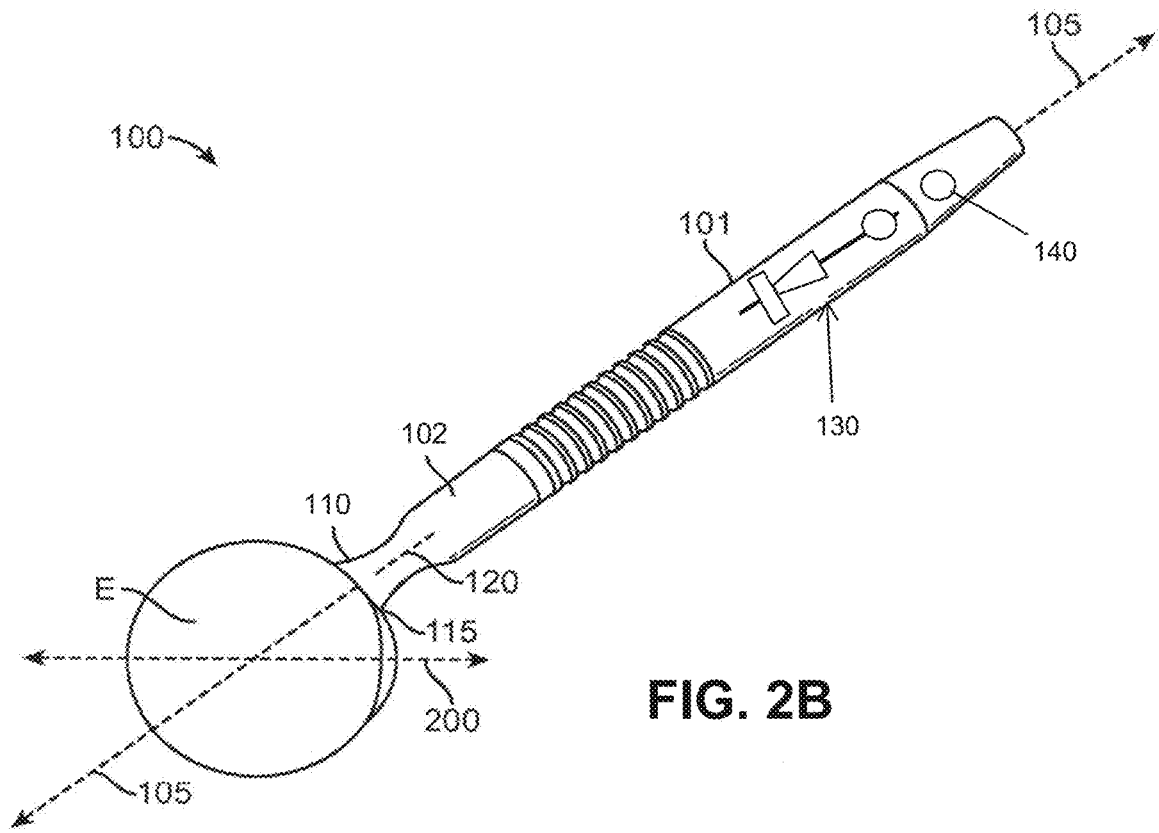
FIG. 2B illustrates the probe of FIG. 2A positioned against the eye, in accordance with some embodiments.

FIGS. 2A-2B illustrate an exemplary intrascleral probe 100. Probe 100 includes an elongate body 101 with a distal contact portion 102. The elongate body 101 defines a handle that may be grasped by a physician to control the probe during the prophylactic treatment. The elongate body 101 has a proximal end and a distal end and defines a treatment axis 105. In some embodiments, the probe 100 has an input end, an output end, a top, a bottom and sides. The elongated body 101 is adapted with an advanceable penetrating member 110 (e.g. needle, cannula) and optical fiber (not shown) that is configured to deliver a prophylactic treatment beam (e.g., laser or light beam) to tissues within the patient's eye E. The fiber is housed within the elongate body 101 and is configured to be advanced through the penetrating member and into the partly penetrated sclera for intrascleral delivery of light energy from a distal end of the fiber. The eye E has a curved sclera, a limbus and an optical axis 200. The distal contact portion 102 of the treatment probe 100 defines a contact surface 103 that conforms to the shape of the sclera. In particular, the contact surface 103 conforms to the shape of the sclera at the limbus when the axis of the treatment probe 100 is substantially perpendicular to the conjunctiva-sclera point of indentation of the eye E. The conforming shape of the contact surface 103 enables the distal portion 102 to be positioned on the surface of the eye E. It is appreciated that in other embodiments, the probe contact surface could be configured to conform to the curvature of the sclera with the probe positioned at any predetermined angle relative to the optical axis 200 of the eye E.

The contact surface 103 is designed to ensure that the light energy is directed substantially perpendicular to the conjunctiva/sclera at the location of the penetration. As described in greater detail herein, the contact surface 115 is designed to allow the physician to administer the prophylactic treatment with the contact surface engaged against the outer surface of the eye, while the penetrating member and fiber are disposed within the sclera.

Probe 100 is specifically designed for the efficient intrascleral transmission of light energy to the targeted choroidal vasculature tissue. In some embodiments, the laser energy is provided within the visible light range, preferably green (495-570 nm) or yellow (570-590 nm). Visible light, particularly yellow and green light, is particularly useful for the prophylactic therapy described herein because this range of light energy balances the considerations of transmissibility through a partly penetrated sclera and absorption by the blood vessels in the choroid vasculature sufficiently to ensure coagulation, which can include permanent or temporary coagulation.

In some embodiments, the distal end portion 102 can be configured to facilitate placement at a certain location, for example adjacent the limbus. In such embodiments, the contact surface 103 can include a limbal placement edge 115, which may be positioned on a short side of the contact surface 103. The limbal placement edge 115 can include a contact surface contour that conforms to the limbus and is generally circularly concave with a radius of about 5.25-6.0 mm. The penetrating member 110 and fiber 120 can be positioned a distance of between 1.5-6.0 mm from the limbal placement edge 115 to facilitate the optimal positioning of the puncture and prophylactic treatment region in a desired area, such as over the eye's pars plana—pars plicata junction and/or over the eye's pars plana. In a specific embodiment, the penetrating member 110 and treatment fiber is positioned a distance of between 2.0 and 5.0 mm from the limbal placement edge 115, for example about 4.0 mm.

The treatment fiber may be coupled with a light energy or laser console (not shown) that is configured to generate the light for prophylactic treatment of the patient's eye. The console may, for example, generate a visible light laser, such as yellow or green, to effect coagulation of the blood vessels of the choroidal vasculature. The console may include one or more outlets for outputting the treatment light and may be configured to couple with the treatment fiber by receiving a proximal connection end of the treatment fiber. Once coupled to the console, the treatment fiber may deliver the treatment light from the console to a distal end of the treatment probe 100 via optical waveguides, fiber optics, light conduits, light guides, light tubes, or the like.

Probe 100 further includes one or more controls 130 to facilitate advancement and retraction of the penetrating member 110 and optical fiber within and/or control depth of penetration. As shown in FIG. 2A, probe 100 include such controls 130 on a proximal portion of elongate body 101 for manual control and adjustment by the clinician during the procedure. The controls can include lever 131 that is operably coupled with the penetrating member 110, movement of which actuates advancement and retraction of penetrating member. The controls can further include a stop 132 that ensures that the penetrating member 110 stops at a pre-determined depth to ensure that the sclera is only partly penetrated. In some embodiments, the stop is adjustable so that a clinician can adjust the depth of total penetration as needed. Since the thickness of the sclera can vary considerably between patients so that it may be necessary to form deeper scleral punctures in some patients. In some embodiments, the clinician can perform an assessment of scleral thickness of a patient before or during the procedure, for example by OCT imaging, then adjust the depth control as needed for the patient. This scleral thickness can also inform the determination of light therapy parameters (e.g. spot size, power, time), as discussed previously. The controls can further include an optical fiber adjustment lever 133 that allows the clinician to advance and retract the optical fiber through the penetrating member 110. In some embodiments, the optical fiber can be affixed within the penetrating member so that it moves with the penetrating member and does not require separate controls.

FIG. 2B illustrates the treatment probe 100 positioned against the eye E with the short limbal placement edge 115 next to the limbus. FIG. 2B further illustrates the treatment probe 100 directing light energy to coagulate the choroidal vasculature while the probe is positioned posterior to the limbus and perpendicular to the surface of the eye, as indicated by the axis 105. The clinician may effect transmission of light therapy by actuation of a control, such as button 140 disposed on the probe. Alternatively, light transmission can be effected by use of controls on a light source console (not shown) operably coupled to the probe. While the probe is shown at a particular position and angle, it is appreciated that the probe could be placed at various other locations and/or angles in order to direct energy at different angles or to various other structures of the eye.

Figure 3A:
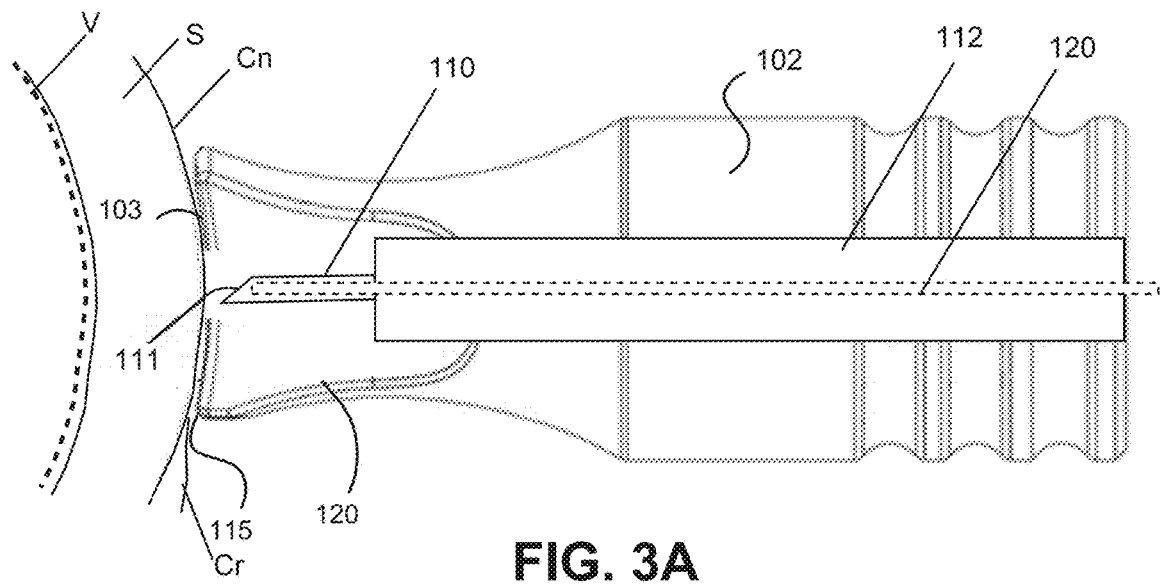
FIGS. 3A-3B illustrate a distal contact portion of the probe of FIG. 2A before and after advancement of the penetration member, in accordance with some embodiments.
Figure 3B:
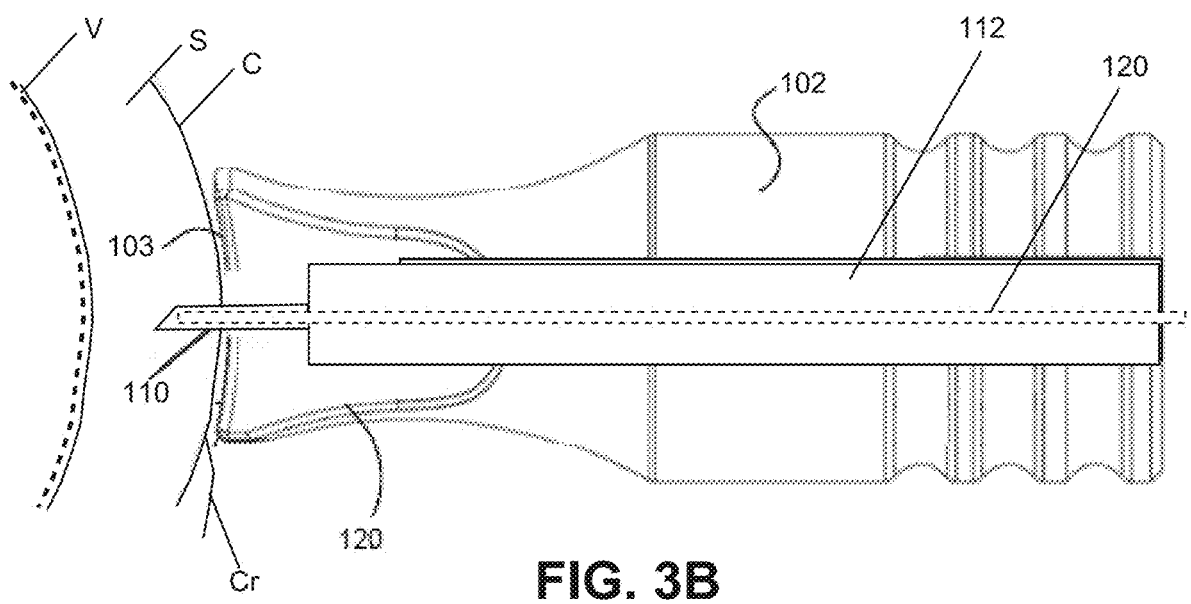

FIGS. 3A-3B illustrate cross-sectional views of a distal contact portion 102 of probe 100 before and after partial penetration of the sclera by the penetrating member 110. The distal contact portion 102 may be fixedly secured at the distal end of the probe 100 or may be a removable and replaceable component of the probe 100, to allow for access and replacement of the penetrating member as needed. In some embodiments, the penetrating member is easily removable and replaceable so that it can be readily replaced between patients.

As shown in FIG. 3A, the distal contact portion 102 of the probe is placed against the outer surface of the eye, typically in a location posterior to the limbus, the border between the cornea Cr and the sclera S, while the penetrating member 110 and optical fiber 120 are retracted within the probe body. As shown, the probe is aligned in a perpendicular direction to the curvature of the eye. The contact surface 103 has a shape that corresponds to the surface of the eye E, and more specifically the shape of the sclera. Specifically, the contact surface 110 shown is concave and has a shape that is approximately the inverse of the curvature of the eye E or sclera. In some embodiments, the distal contact portion 102 can include an enlarged foot that extends laterally so as to provide more stable engagement with the eye during puncturing of the sclera, which is one of the toughest tissues in the body and requires sufficient force to penetrate. In some embodiments, the probe is placed at a pre-determined location, such as adjacent the limbus, typically about 2-8 mm (e.g. about 4 mm) posterior of the limbus, along the planned incision area. As shown, the contact portion 102 can include a placement edge 115 for placement against the limbus. It is appreciated that the probe can be placed along various other locations as desired. Once the probe is properly positioned and engaged against the surface of the eye E, the clinician can actuate advancement of the penetrating member 110 to partially puncture the sclera.

Figure 12:
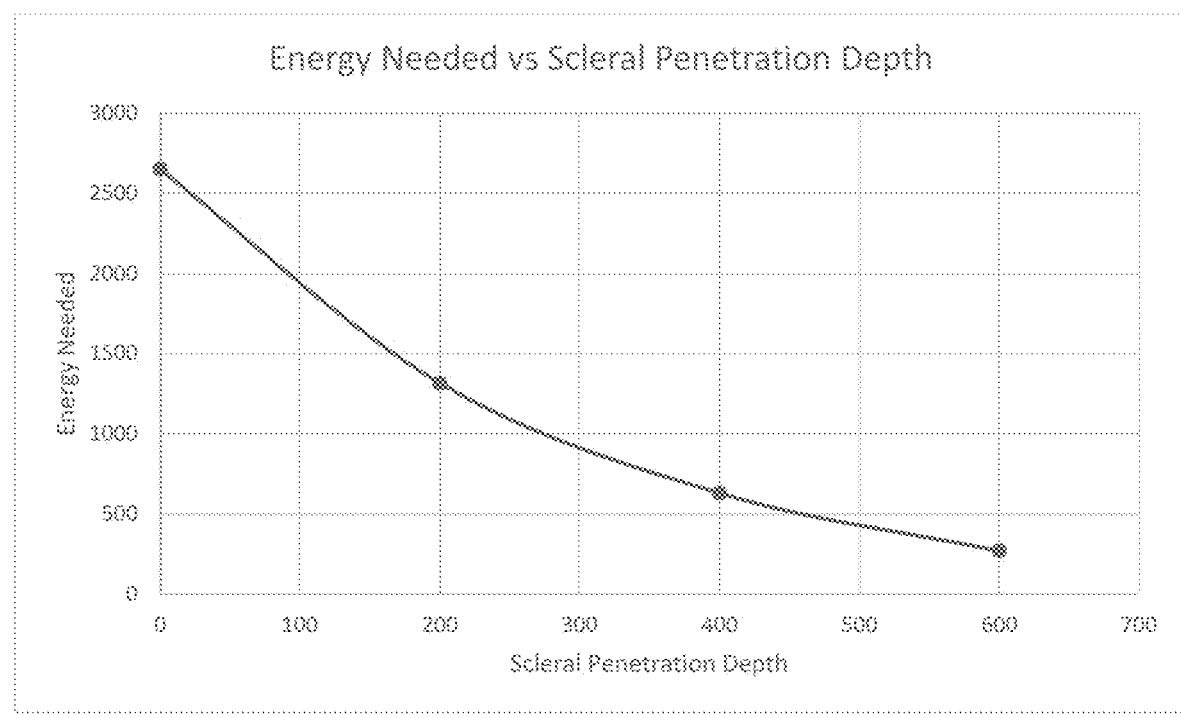
FIG. 12 graphically illustrates a relationship between energy and scleral penetration depth for a treatment, in accordance with some embodiments.
Figure 13:
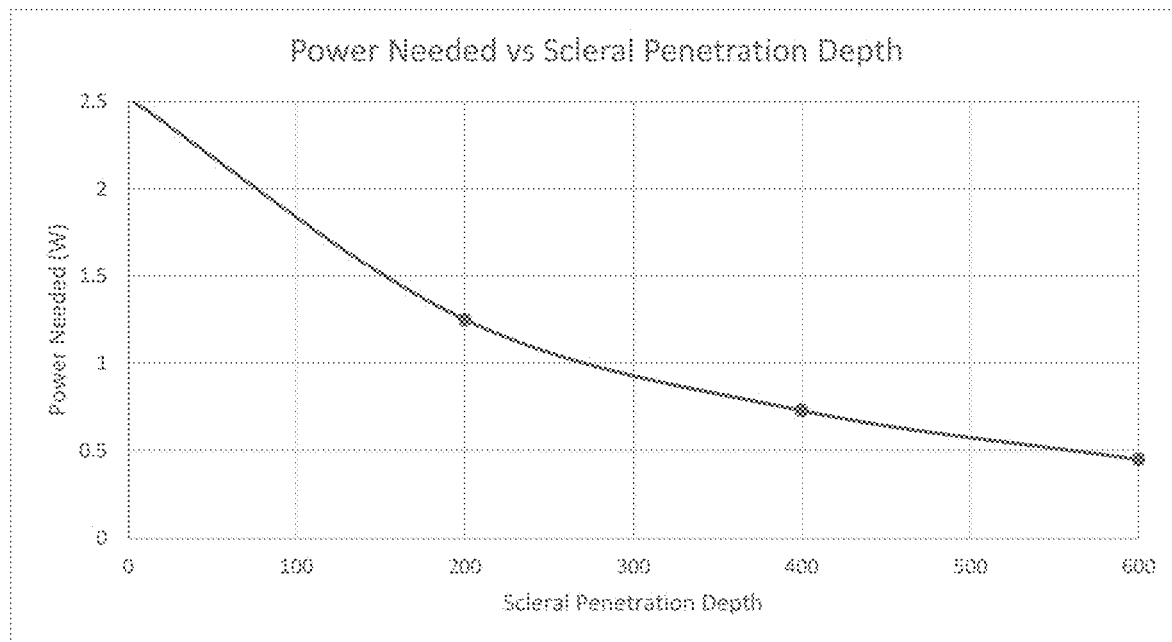
FIG. 13 graphically illustrates a relationship between power and scleral penetration depth for a treatment, in accordance with some embodiments.

As shown in FIG. 3B, the penetrating member 110 has been advanced so as to partially puncture the sclera with the sharpened distal tip 111 of the penetrating member 110. The penetrating member 110 can be supported by a hollow penetrating member 112 that is operably coupled to the depth control and actuation mechanisms discussed previously. The depth control includes a stop that limits the advancement of the penetrating member to the desired depth so as to ensure the penetrating member does not completely puncture through the sclera. In most patients, the sclera is about 800 microns thick, therefore, the depth control can be set to any desired depth for placement of the fiber within the sclera. In some embodiments, it may be advantageous to form a penetration that is at least across a substantial portion of the sclera (at least 10% or 30% of the sclera), or for some applications, a majority of the thickness of the sclera (at least 50% of the sclera), or even more preferably at least 75% of the sclera, 80% or 90% of the sclera. It is appreciated that these concepts can utilize any penetration depth of the sclera and that the penetration depth may be determined based on the treatment parameters needed for a particular treatment. For example, a relationship between the scleral thickness and the energy or power needed (as can be seen in FIGS. 12-13) may be used to determine a desired scleral penetration depth in combination with suitable treatment parameters. Once the partial penetration is formed, the optical fiber 120 can be advanced through the penetrating member 110 and light energy transmitted through the fiber 120 to coagulate the underlying vasculature V underlying the sclera. Alternatively, the penetrating member can be retracted into the probe before advancing the fiber into the sclera.

Figure 4:
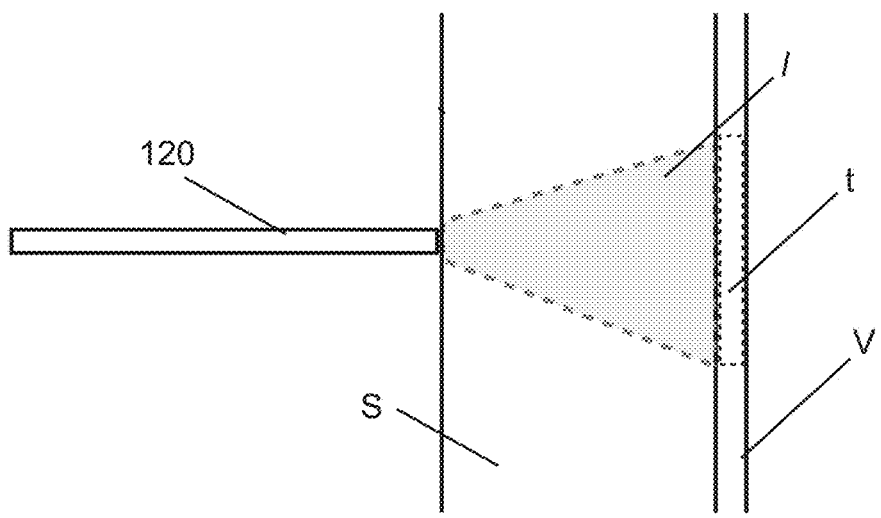
FIGS. 4-5 illustrates light transmission from a fiber contacting the sclera and from a fiber within the sclera, in accordance with some embodiments.
Figure 5:
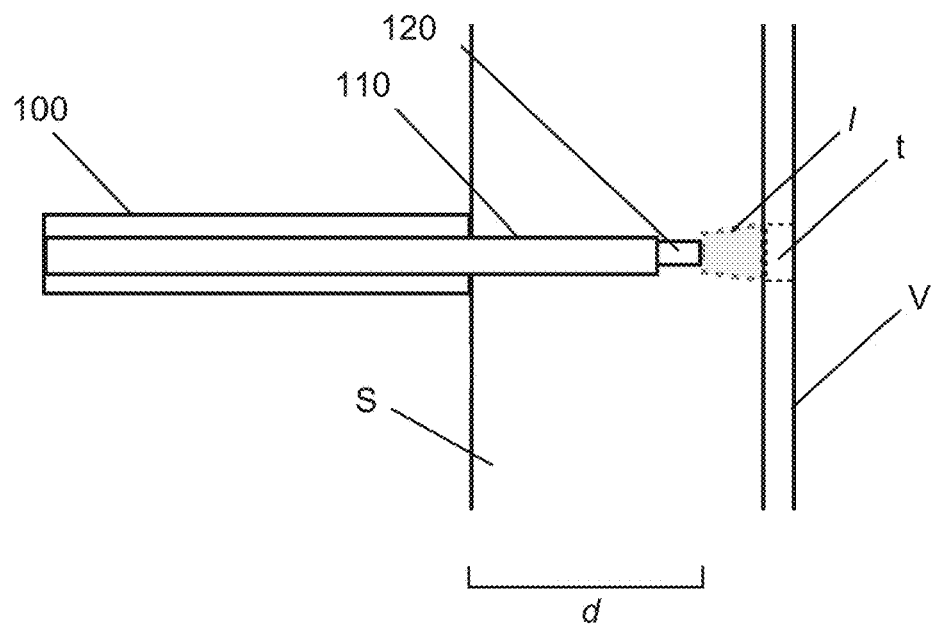

As can be seen in FIGS. 4-5, forming a partial penetration within the sclera and advancing the optical fiber to transmit light energy from within the partially penetrated sclera allows for greatly improved transmission through the sclera and provides more control over the size and extent of the treated coagulation area of the underlying vasculature. As shown in FIG. 4, transmitting light energy (l) from a fiber 120 placed in contact with an intact sclera S causes considerable scattering and an enlarged treatment spot (t) at the target tissue of the vasculature V. The result is that greater power and/or time is require to attain coagulation of the vasculature, which can cause undesired damage to surrounding tissues outside of the planned incision area. As shown in FIG. 5, by placing the fiber within a partial penetration in the sclera X, there is considerably less scattering and improved transmission of the light beam (l) such that the treatment spot (t) is much smaller, thereby providing more efficient coagulation at the vasculature that is confined to the immediate region within the planned incision area. As discussed, the depth (d) can be determined based on the spot size and parameters desired, although typically, it is advantageous for the depth to cross a majority of the scleral thickness.

Figure 6:
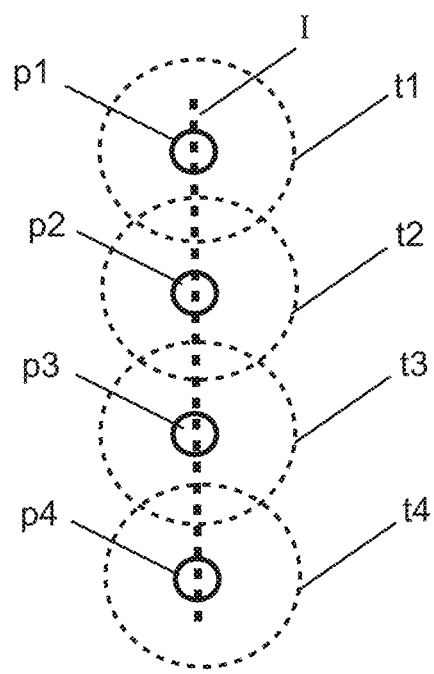
FIG. 6 illustrate a pattern of scleral partial penetrations and associated choroid vascular coagulation regions formed along a planned incision region, in accordance with some embodiments.
Figure 7:
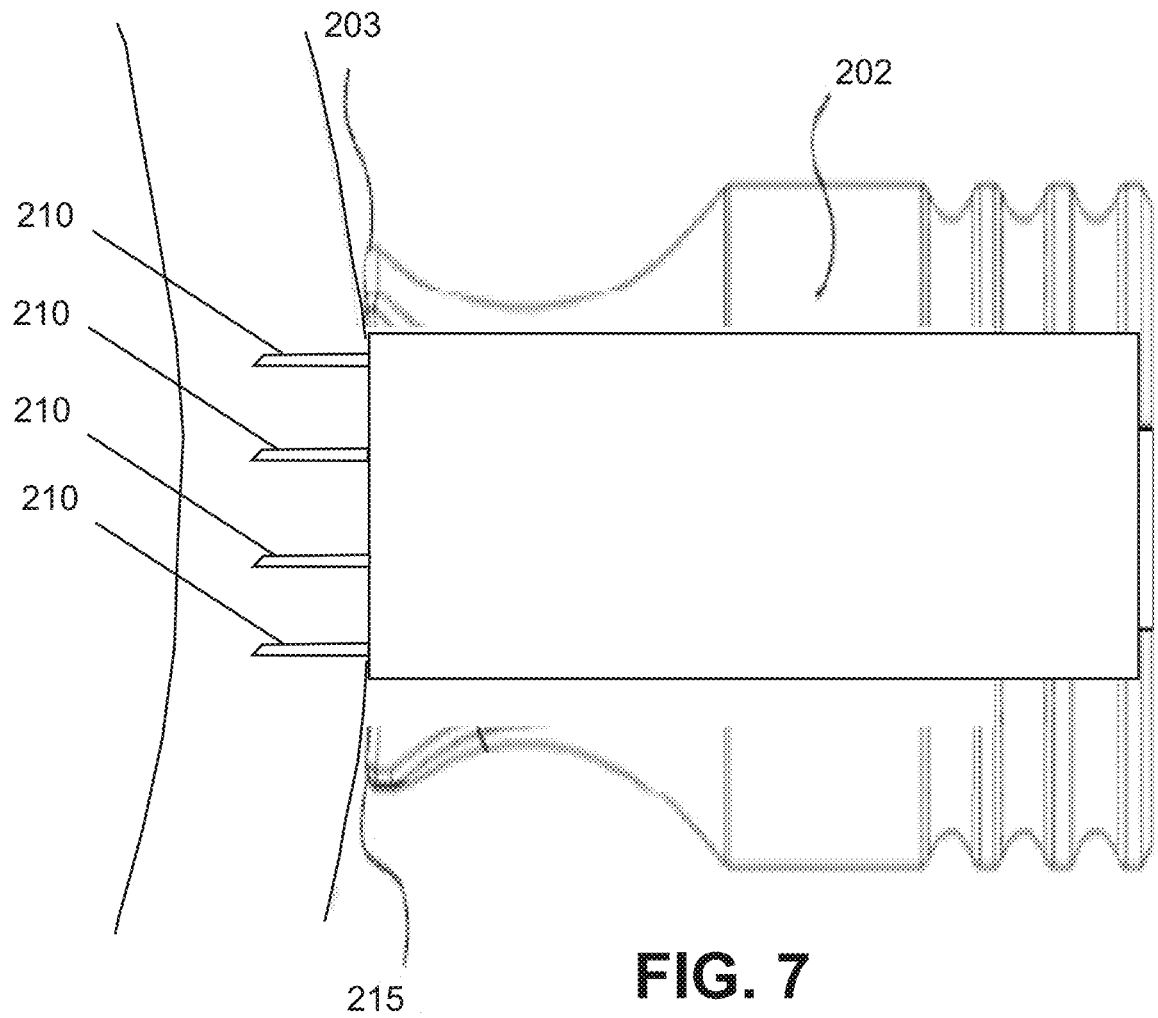
FIG. 7 illustrates a probe with multiple penetrating members for concurrently forming scleral penetrations to cover a planned incision region.

FIG. 6 illustrates a typical pattern of punctures and treated areas that a clinician may form using the above-described methods in order to prophylactically treat an entire region along a planned incision I. The clinician may use the probe 100 to partially penetrate the sclera at each of penetrations P1 and by transmission of light energy from the optical fiber create a treated coagulation area t1. Then sequentially, the clinician repeats the process at each of penetrations P2-P4 until the entire region along the planned incision is treated. The clinician can the proceed to form the incision to perform an eye treatment, such as for implantation of a drug-eluting implant or stent, without bleeding of the underlying vasculature.

Figure 8:
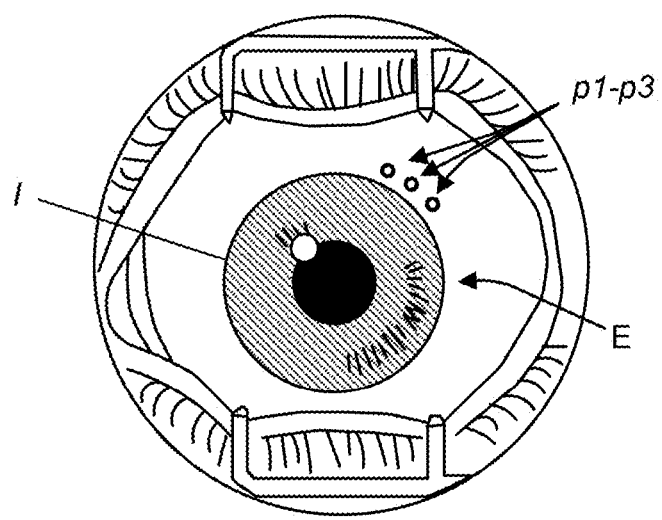
FIG. 8 illustrates a region of the eye and penetrations for a planned incision region.

In another approach, the probe can include with a distal tip 202 configured to form multiple penetrations concurrently with multiple penetrating members 210 and allow subsequent transmission of light energy through multiple optical fibers (not shown) in order to treat the entire area of the planned incision area. This approach may be advantageous as it creates all penetrations at precisely spaced increments and streamlines the sequential process described above. Such a probe can include multiple optical fibers, one for each of the penetrating members. In some embodiments, the light can be transmitted through the fibers concurrently. In other embodiments, the light can be transmitted through one or more fibers in a sequence so as to avoid excess energy from overlapping regions between treated areas. As shown, the distal tip includes four penetrating members, which is well suited for prophylactically treating a region corresponding to an incision between 2-4 mm, typically about 3.5 mm, which is a standard incision length for a typical drug-eluting implant. It is appreciated that such a probe can include various other numbers of penetrating members, including fewer or greater than four, and that such penetrating members can be spaced at regular or irregular intervals from each other. In some embodiments, the penetrating members are positioned in a linear fashion, so as to form a linear region such as that shown in FIG. 6. In other embodiments, the penetrating members can be disposed along an arc, such as P1-P3 shown in FIG. 8, to form a treated area along an arc. This latter option is desirable as many incisions extend in an arc that is posterior of the limbus to minimize damage to adjacent structures within a readily accessible portion of the eye.

It is appreciated that the light therapy can be deliver in any suitable manner, for example, by a pulsed or continuous wave emission mode. For example, in some embodiments, the light energy may be delivered with a 30% duty cycle having an "on" time of about 500 µs and an "off" time of about 1100 µs. In other embodiments, the light energy may be delivered with a 15% duty cycle having an "on" time of about 300 µs and an "off" time of about 1700 µs, or about a 10% duty cycle having an "on" time of about 200 µs and an "off" time of about 1800 µs. Careful selection of the laser energy pulse "on" and "off" times can avoid undesired thermal damage to a target by allowing the target to cool during the "off" time of the laser before the next pulse of energy is delivered during the "on" time. The duty cycle may be selected so that cumulative thermal buildup, caused by insufficient cooling during the "off" time may be avoided. Thus, damage may be reduced to a minimum level, but is sufficient to induce a heat sufficiently to permanently coagulate the region within the planned incision.

Figure 9:
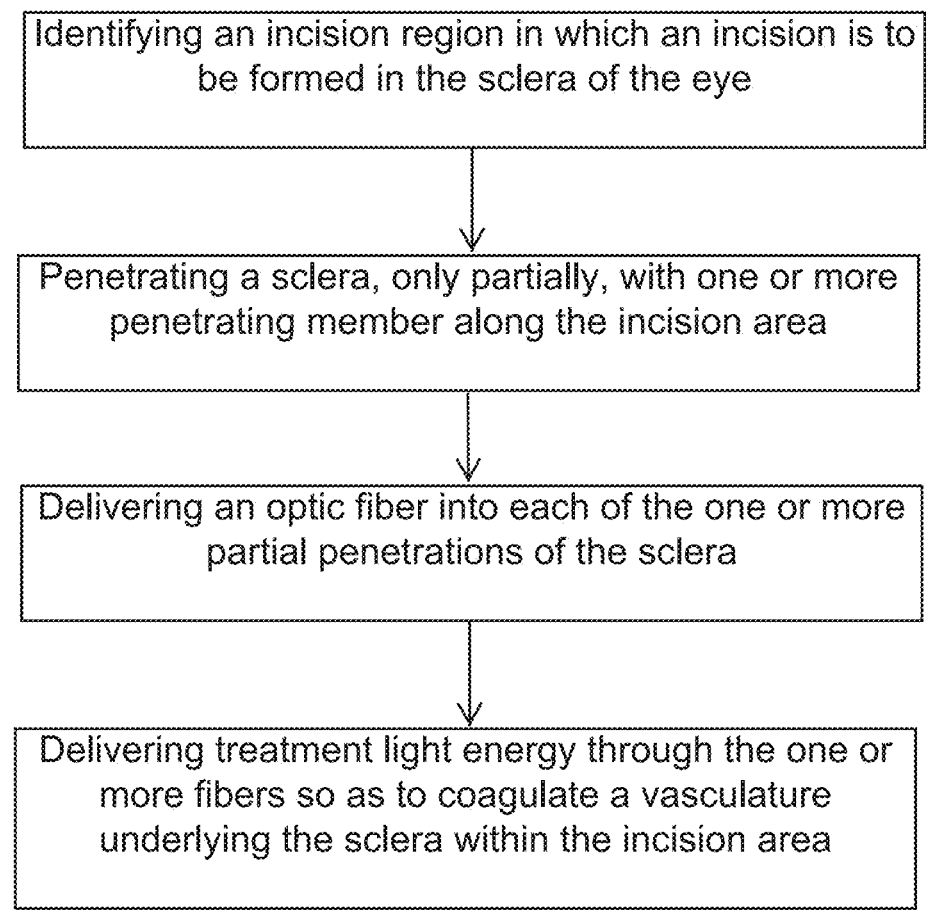
FIG. 9 illustrates a method of prophylactically treating an eye of a patient, in accordance with some embodiments.
Figure 10:
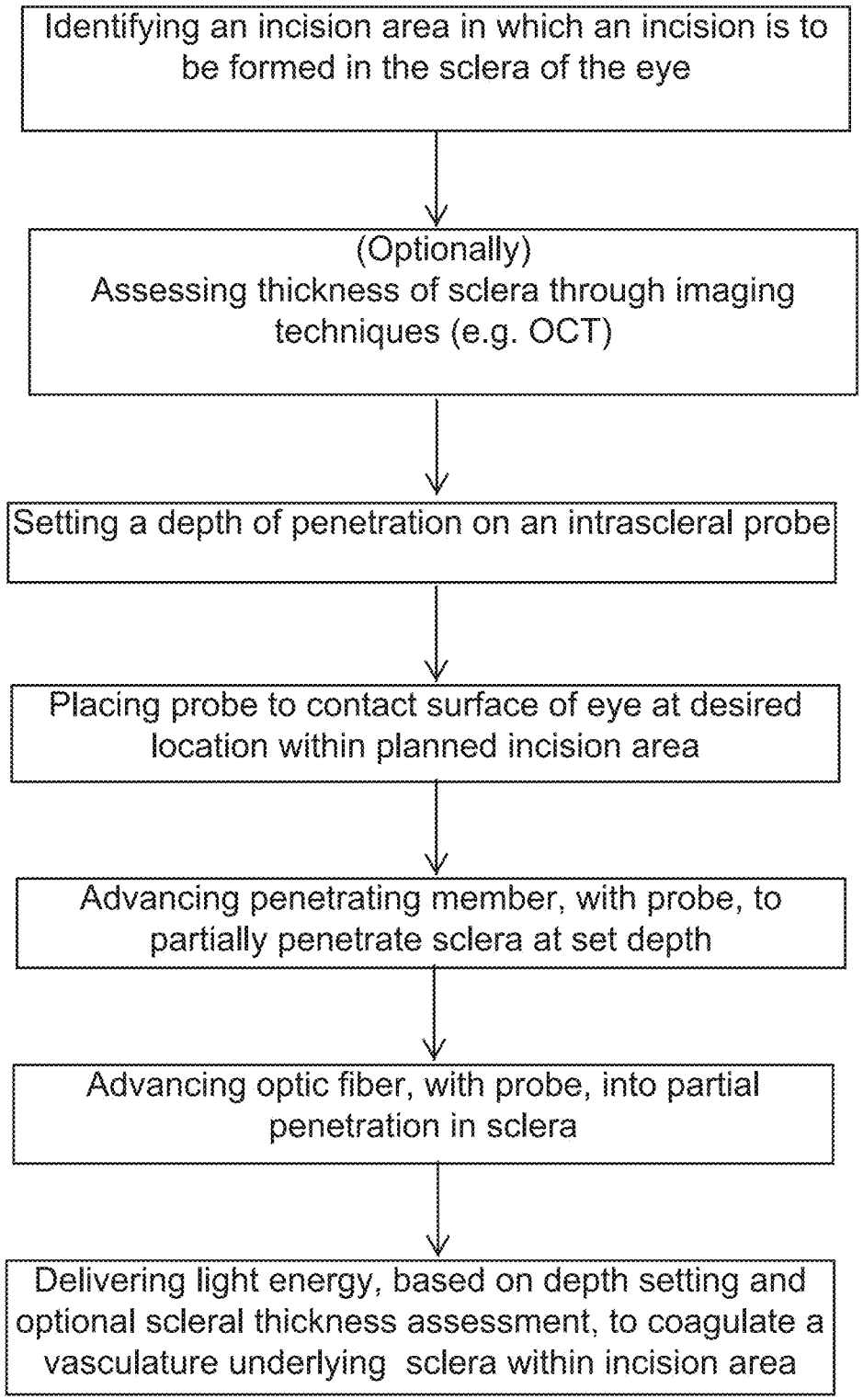
FIG. 10 illustrates a method of prophylactically treating an eye of a patient, in accordance with some embodiments.
Figure 11:
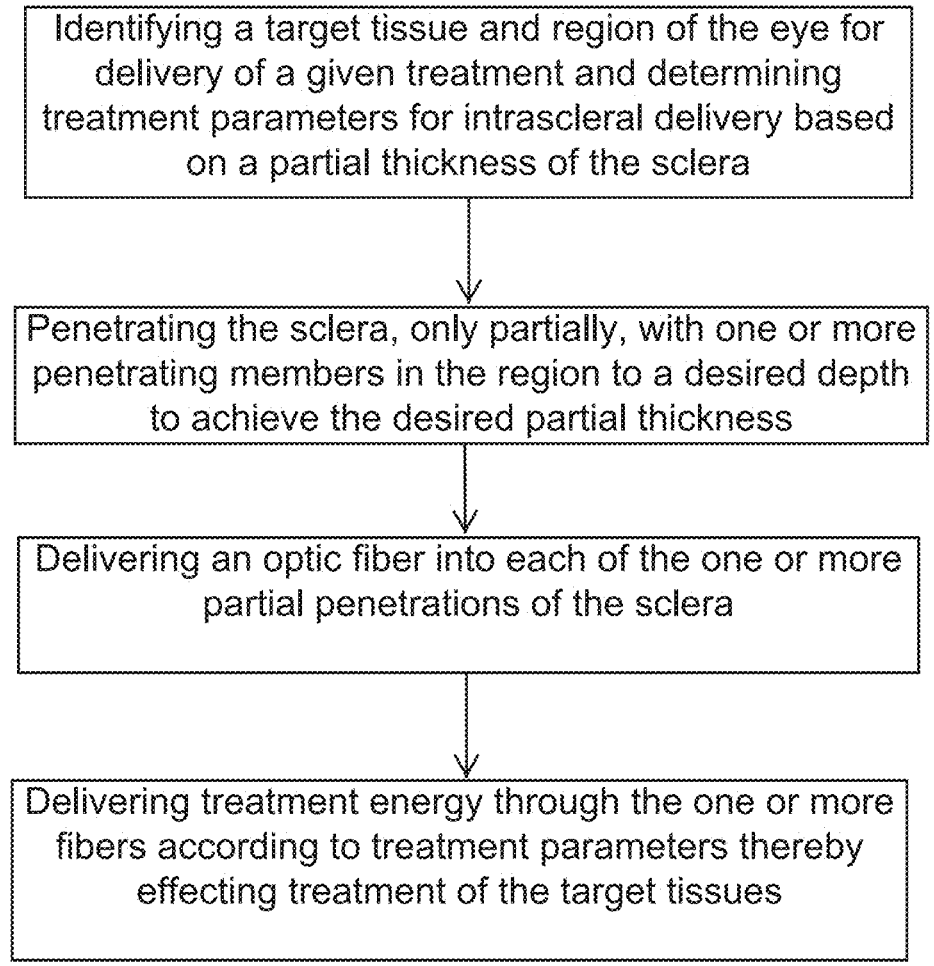
FIG. 11 illustrates a method of treating an eye of a patient, in accordance with some embodiments.

FIGS. 9-11 illustrate exemplary methods of treating targeted tissues within the eye. It is appreciated that these methods are exemplary and these concepts can be applied to various other methods and application as well.

The method of FIG. 9 includes steps of: identifying an incision region in which an incision is to be formed in the sclera of the eye; penetrating a sclera, only partially, with one or more penetrating member along the incision area; delivering an optic fiber into each of the one or more partial penetrations of the scleral; and delivering treatment light energy through the one or more fibers so as to coagulate a vasculature underlying the sclera within the incision area. In some embodiments, the method includes forming multiple penetrations and treatment regions to cover the entire planned incision area. The multiple penetrations can be formed sequentially with a probe forming one penetration and treatment area, or can be formed concurrently by a probe forming multiple penetrations simultaneously.

The method of FIG. 10 includes steps of: identifying an incision area in which an incision is to be formed in the sclera of the eye; optionally, assessing thickness of sclera through imaging techniques (e.g. OCT); setting a depth of penetration on an intrascleral probe; placing probe to contact surface of eye at desired location within planned incision area; advancing the penetrating member, with the probe, to partially penetrate sclera at set depth; the, advancing an optical fiber, with the probe, into the partial penetration within sclera; and then delivering light energy, based on depth setting and optional scleral thickness assessment, to coagulate a vasculature underlying sclera within incision area.

The method of FIG. 11 includes steps of: identifying a target tissue and region of the eye for delivery of a given treatment and determining treatment parameters for intrascleral delivery based on a partial thickness of the sclera; penetrating the sclera, only partially, with one or more penetrating members in the region to a desired depth to achieve the desired partial thickness; delivering an optic fiber into each of the one or more partial penetrations of the sclera; and delivering treatment energy through the one or more fibers according to treatment parameters thereby effecting treatment of the target tissues. It is appreciated that targeted tissues could be any number of tissues within the eye for a given treatment, including but not limited to the choroid vasculature, the ciliary body, pigmented epithelium, limbus, Schlemm's canal, trabecular meshwork, lamina fusca and other structures. Further, it is appreciated that the treatment parameters could be devised to alter or modify the target tissue in any number of ways, for example, coagulating tissues, ablating tissues, remodeling or reshaping tissues, heating, thermal cycling, stimulating, contracting, triggering an immune response or any desired treatment modality. Thus, the methods described herein are applicable to any number of treatments of the eye that entail delivering energy through the sclera to targeted tissues.

The advantages of this intrascleral approaches described above can be highlighted through the following examples. It is understood that the invention is not limited to the following examples or the details and assumptions associated with each example.

In Example (1), the above described approach is utilized in a prophylactic treatment in which the targeted tissue is the choroid vasculature and the desired response is coagulation of the choroid vasculature. The assumptions and approximations for this example are: a human subject, a scleral thickness of 800 µm thick, a 600 µm incident spot diameter, 532 nm light, and fluence to be delivered to the choroid vasculature is 500 $J/cm^2$. It is appreciated that this is merely an example and that the spot size, wavelength, fluence to be delivered, pulse duration and other typical laser parameters, tissue characteristics and therapeutic goals may be different. MonteCarlo tissue modeling is well established and can be used to approximate the required incidence fluence under the given assumptions.

For a full transscleral approach, where the probe tip is not penetrating the sclera tissue, the incident fluence required to achieve 500 J/cm$^2$ to the choroid vasculature is approximately 2,650 J. For an intrascleral approach penetration 200 μm into the sclera, leaving 600 μm of sclera material through which the light must transmit, the incident fluence required to achieve 500 J/cm$^2$ to the choroid vasculature is approximately 1,315 J. For an intrascleral approach penetration 400 μm into the sclera, leaving 400 μm of sclera material through which the light must transmit, the incident fluence required to achieve 500 J/cm$^2$ at the choroid vasculature is approximately 630 J. For an intrascleral approach penetration 600 μm into the sclera, leaving 200 μm of sclera material through which the light must transmit, the incident energy required to achieve 500 J/cm$^2$ at the choroid vasculature is approximately 270 J.

This relationship of treatment parameters versus scleral thickness can be further appreciated by referring to FIG. 12, which illustrates a graph of incidence fluence versus penetration depth. As can be appreciated, delivering 2,650 J for a full transscleral approach may pose to be challenging clinically. The combination of modest absorption of light in the sclera and the high energy may cause unwanted damage to the sclera tissue. The lower incident energy required with the intrascleral approach reduces the risk of injury to the sclera. In addition to affecting the required incidence fluence, the intrascleral depth has a direct effect on the spot size of the light that penetrates through the sclera. A therapeutically desired spot size can be achieved at targets beyond the sclera tissue, in part, by adjusting the probe tip penetration depth in the scleral tissue. In one case, coagulating a large area of vessels behind the sclera may be clinically advantageous to control bleeding when the tissue is incised. In another case where a small specific tissue or tissue region is being targeted for therapy, a smaller spot size will be advantageous. In the example above, the difference in the treatment area (area of the spot size) at the choroid vascular by using the intrascleral approach with a 600 μm penetration depth is roughly 2.3× smaller than using a full transscleral approach. Thus, the intrascleral penetration depth is one new parameter that allows different and clinically advantageous settings of power and/or energy delivered, spot size, wavelength, pulse duration and other typical laser parameters for treatment.

In Example (2), the above described approach is utilized within a treatment in which the target tissue is the ciliary body muscle and the desired response is thermal injury to cause contraction of the tissue. The assumptions and approximations for this example are: a human subject is human, a sclera of 800 μm thickness, a 600 um incident spot diameter, 810 nm light, and 2.5 Watts at the anterior scleral surface. MonteCarlo tissue modeling is well established and can be used to approximate the required incidence fluence under the given assumptions.

For a full transscleral approach, where the probe tip is not penetrating the sclera tissue, the incident irradiance on the ciliary body is approximately 1.2 W/cm$^2$. For an intrascleral approach penetration 200 μm into the sclera, which leaves 600 μm of sclera material through which the light must transmit, the incident irradiance on the ciliary body is approximately 2.4 W/cm$^2$, and to match the 1.2 W/cm$^2$ incident irradiance at the ciliary body, only about 1.25 Watts of power is required at the anterior scleral surface. For an intrascleral approach penetration 400 um into the sclera, which leaves 400 μm of sclera material through which the light must transmit, the incident irradiance on the ciliary body is approximately 4.1 W/cm$^2$, and to match the 1.2 W/cm$^2$ incident irradiance at the ciliary body, only about 0.73 Watts of power is required at the anterior scleral surface. For an intrascleral approach penetration 300 um into the sclera, which leaves 500 μm of sclera material through which the light must transmit, the incident irradiance on the ciliary body is approximately 6.6 W/cm$^2$, and to match the 1.2 W/cm$^2$ incident irradiance at the ciliary body, only about 0.45 Watts of power is required at the anterior scleral surface This relationship of treatment parameters versus scleral penetration depth can be further appreciated by referring to FIG. 13, which illustrates a graph of incidence irradiance power needed versus penetration depth. In this example, the difference in the treatment area (area of the spot size) at the ciliary body by using the intrascleral approach with a 600 μm penetration depth is roughly 2.5× smaller than using a full transscleral approach.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth. As used herein, the term "about" means +/−10% of the respective value.

What is claimed is:

1. A method of treating an eye of a patient, the method comprising:
    identifying an incision area in which an incision is to be formed in a sclera of the eye;
    positioning a probe, the probe having a penetrating member and an optical fiber operably disposed within, at a first location along the incision area;
    penetrating the sclera with the penetrating member within the incision area at the first location by advancing the penetrating member from the probe, thereby penetrating the sclera, wherein advancing the penetrating member comprises advancing the penetrating member until the penetrating member or associated support member engages a stop, the stop corresponding to a desired depth of the scleral penetration;
    delivering the optical fiber into the penetrated sclera at the first location by advancing the optical fiber from the probe into the penetrated sclera; and
    delivering treatment light energy through the optical fiber at the first location so as to coagulate vasculature underlying the sclera within the incision.

2. The method of claim 1, wherein the identified incision area is over the sclera adjacent the limbus.

3. The method of claim 1, wherein the light energy is within the visible light spectrum.

4. The method of claim 3, wherein the light energy is laser energy with a green or yellow light range of the visible light spectrum.

5. The method of claim 1, wherein positioning the probe comprises:
    placing an alignment edge of a contact surface of the probe against a reference feature of the eye, wherein the reference feature is a limbus.

6. The method of claim 5, wherein the penetrating member is spaced apart from the alignment edge by 1 mm to 5 mm.

7. The method of claim 1, wherein the desired depth is 25% of estimated or measured scleral thickness or greater.

8. The method of claim 1, further comprising:
    adjusting a depth control of the probe that sets the stop to the desired depth.

9. The method of claim 8, wherein adjusting the depth control is based on an estimate or assessment of scleral thickness.

10. A method of treating an eye of a patient, the method comprising:
    identifying an incision area in which an incision is to be formed in a sclera of the eye;
    positioning a probe, the probe having a penetrating member and an optical fiber operably disposed within, at a first location along the incision area;
    penetrating the sclera with the penetrating member within the incision area at the first location by advancing the penetrating member from the probe, thereby penetrating the sclera, wherein the penetrating member comprises a cannula or needle;
    delivering the optical fiber into the penetrated sclera at the first location by advancing the optical fiber from the probe into the penetrated sclera; and
    delivering treatment light energy through the optical fiber at the first location so as to coagulate vasculature underlying the sclera within the incision.

11. The method of claim 10, wherein advancing the penetrating member comprises advancing the penetrating member until the penetrating member or associated support member engages a stop, the stop corresponding to a desired depth of the scleral penetration.

12. The method of claim 11, wherein the desired depth is 25% of estimated or measured scleral thickness or greater.

13. The method of claim 11, further comprising:
    adjusting a depth control of the probe that sets the stop to the desired depth.

14. The method of claim 13, wherein adjusting the depth control is based on an estimate or assessment of scleral thickness.

15. The method of claim 10, wherein advancing the optical fiber comprises advancing the optical fiber through the cannula or needle.

16. The method of claim 10, wherein the identified incision area is over the sclera adjacent the limbus.

17. The method of claim 10, wherein the light energy is within the visible light spectrum.

18. The method of claim 10, wherein the light energy is laser energy with a green or yellow light range of the visible light spectrum.

19. The method of claim 10, further comprising forming the incision along the identified incision area for placement of an implant.

20. A method of treating an eye of a patient, the method comprising:
    identifying an incision area in which an incision is to be formed in a sclera of the eye;
    positioning a probe, the probe having a penetrating member and an optical fiber operably disposed within, at a first location along the incision area;
    penetrating the sclera with the penetrating member within the incision area at the first location;
    delivering the optical fiber into the penetrated sclera at the first location;
    delivering treatment light energy through the optical fiber at the first location so as to coagulate vasculature underlying the sclera within the incision;
    penetrating the sclera with the penetrating member within the incision area at a second location within the incision area;
    delivering the optical fiber into the penetrated sclera at the second location;
    delivering treatment light energy through the optical fiber at the second location so as to coagulate the vasculature underlying the sclera within the incision area;
    penetrating the sclera with the penetrating member within the incision area at one or more additional locations within the incision area;
    delivering the optical fiber into the penetrated sclera at each of the one or more additional locations; and
    delivering treatment light energy through the optical fiber at each of the one or more additional locations so as to coagulate the vasculature underlying the sclera within the incision area,
    wherein the first, second and one or more additional penetrations are spaced apart such that the vasculature coagulated underlies the entire identified incision area.

21. The method of claim 20, wherein penetrating member comprises a needle or cannula.

22. The method of claim 20, further comprising:
    advancing the penetrating member from the probe, thereby penetrating the sclera; and
    advancing the optical fiber from the probe into the penetrated sclera.

23. The method of claim 20, wherein the penetrations at the first, the second and the one or more additional locations are formed sequentially by moving the probe between each location.

24. The method of claim 23, further comprising:
placing a template on the eye to facilitate precise spacing of the probe at the first, the second and the one or more additional locations.

25. The method of claim 23, further comprising:
forming the incision along the identified incision area for placement of an implant.

26. A method of treating an eye of a patient, the method comprising:
identifying an incision area in which an incision is to be formed in a sclera of the eye;
positioning a probe into locations along the incision area, the probe having a plurality of penetrating members and one or more an optical fibers operably disposed within the penetrating members;
penetrating the sclera with a first penetrating member within the incision area at a first location;
delivering a first optical fiber into the penetrated sclera at the first location;
delivering treatment light energy through the first optical fiber at the first location so as to coagulate vasculature underlying the sclera within the incision;
penetrating the sclera by advancing one or more additional penetrating members of the probe at one or more additional locations within the identified incision area;
advancing one or more additional optical fibers into the penetrated sclera at the one or more additional locations; and
delivering treatment light energy through the one or more additional optical fibers at the one or more additional locations so as to coagulate the vasculature underlying the sclera within the incision area,
wherein the first and one or more additional locations are spaced apart such that the vasculature coagulated underlies the entire identified incision area.

27. The method of claim 26, wherein the penetrations at the first location and the one or more additional locations are formed concurrently by the probe.

28. The method of claim 26, wherein the penetrations at the first location and the one or more additional locations comprise four total locations corresponding to an incision of between 2 and 5 mm in length.

29. The method of claim 26, further comprising:
forming the incision along the identified incision area for placement of an implant.

* * * * *